US011858537B2

(12) United States Patent
     Kim (10) Patent No.: US 11,858,537 B2
(45) Date of Patent: Jan. 2, 2024

(54) METHOD OF CONTROLLING OPERATION OF FOLDABLE ACCELERATOR PEDAL DEVICE IN MANUAL DRIVING MODE OF AUTONOMOUS DRIVING VEHICLE

(71) Applicants: HYUNDAI MOTOR COMPANY, Seoul (KR); KIA MOTORS CORPORATION, Seoul (KR)

(72) Inventor: Eun Sik Kim, Gwangmyeong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 337 days.

(21) Appl. No.: 17/146,048

(22) Filed: Jan. 11, 2021

(65) Prior Publication Data
    US 2022/0055665 A1    Feb. 24, 2022

(30) Foreign Application Priority Data
    Aug. 20, 2020   (KR) .......... 10-2020-0104850

(51) Int. Cl.
    *B60W 60/00*    (2020.01)
    *B60W 50/16*    (2020.01)
    (Continued)

(52) U.S. Cl.
    CPC .. *B60W 60/0059* (2020.02); *B60W 30/18109* (2013.01); *B60W 50/10* (2013.01);
    (Continued)

(58) Field of Classification Search
    CPC ....... B60W 60/0059; B60W 30/18109; B60W 50/10; B60W 50/16; B60W 60/0053;
    (Continued)

(56) References Cited

U.S. PATENT DOCUMENTS 1,156,990 A   10/1915  Foljambe
6,179,079 B1   1/2001  Basnett
(Continued)

FOREIGN PATENT DOCUMENTS

FR           2981889      1/2014
GB           2477123 A    7/2011
KR     10-2017-0137427   12/2017

OTHER PUBLICATIONS

Non Final Office Action issued in related U.S. Appl. No. 17/010,371, dated Jul. 7, 2022 (20 pages).
(Continued)

*Primary Examiner* — James J Lee
*Assistant Examiner* — Alexander George Matta
(74) *Attorney, Agent, or Firm* — Lempia Summerfield Katz LLC (57) ABSTRACT

A method of controlling the operation of a foldable accelerator pedal device in manual driving mode of an autonomous driving vehicle includes: when an autonomous driving vehicle provided with a foldable accelerator pedal device is driven in manual driving mode and the speed of the autonomous driving vehicle exceeds the driving speed limit of a road, a safety mode, which includes a haptic mode and a pedal pad protrusion reducing mode, and a pedal pad hiding mode, is activated using an actuator provided for a folding function of a pedal pad.

16 Claims, 4 Drawing Sheets

(51) Int. Cl.
*B60W 30/18* (2012.01)
*B60W 50/10* (2012.01)
*B60W 50/14* (2020.01)

(52) U.S. Cl.
CPC ........ *B60W 50/16* (2013.01); *B60W 60/0053* (2020.02); *B60W 2050/146* (2013.01); *B60W 2510/18* (2013.01)

(58) Field of Classification Search
CPC ....... B60W 2050/146; B60W 2510/18; B60W 2520/10; B60W 2540/10; B60W 2555/60; B60W 50/14; B60W 60/0015; B60W 2050/143; B60W 40/105; B60K 26/02; B60K 35/00; B60K 2370/175; B60K 2370/178; G05D 1/0061; B60Y 2400/90
See application file for complete search history.

(56) References Cited

U.S. PATENT DOCUMENTS

| | | | |
|---|---|---|---|
| 6,182,525 | B1 | 2/2001 | Bowers et al. |
| 6,364,047 | B1 | 4/2002 | Bortolon |
| 9,283,934 | B2 | 3/2016 | Shand |
| 9,342,092 | B2 | 5/2016 | Baur et al. |
| 10,220,703 | B2 | 3/2019 | Viethen |
| 10,739,011 | B2 | 8/2020 | Cowan et al. |
| 10,889,226 | B1 | 1/2021 | Dean et al. |
| 10,906,514 | B1 | 2/2021 | Kim et al. |
| 10,913,419 | B2 | 2/2021 | Mullen et al. |
| 10,946,741 | B1 | 3/2021 | Kim et al. |
| 10,988,097 | B2 | 4/2021 | Ghaffari et al. |
| 10,994,611 | B1 | 5/2021 | Kim |
| 11,021,058 | B1 | 6/2021 | Kim et al. |
| 11,225,226 | B1 | 1/2022 | Kim et al. |
| 11,249,506 | B1 | 2/2022 | Kim et al. |
| 11,305,647 | B2 | 4/2022 | Kim et al. |
| 11,327,520 | B1 | 5/2022 | Kim et al. |
| 11,565,725 | B2 | 1/2023 | Kim |
| 11,602,990 | B1 | 3/2023 | Kim et al. |
| 11,613,236 | B2 | 3/2023 | Kim et al. |
| 2001/0015111 | A1 | 8/2001 | Rixon et al. |
| 2003/0110879 | A1 | 6/2003 | Massey et al. |
| 2004/0259687 | A1 | 12/2004 | Ritter et al. |
| 2008/0004806 | A1* | 1/2008 | Kimura ................ B60W 50/16 701/301 |
| 2008/0141820 | A1* | 6/2008 | Park ........................ G05G 5/03 74/513 |
| 2008/0147287 | A1 | 6/2008 | Park et al. |
| 2009/0223319 | A1 | 9/2009 | Choi |
| 2010/0139445 | A1 | 6/2010 | Kim et al. |
| 2011/0132134 | A1 | 6/2011 | Kim et al. |
| 2013/0125682 | A1 | 5/2013 | Kim et al. |
| 2014/0311278 | A1 | 10/2014 | Min et al. |
| 2014/0316648 | A1 | 10/2014 | Min |
| 2014/0373667 | A1 | 12/2014 | Kim |
| 2015/0107402 | A1 | 4/2015 | Leem |
| 2015/0253804 | A1 | 9/2015 | Baur et al. |
| 2016/0311321 | A1* | 10/2016 | Maruyama ............ B60W 50/16 |
| 2016/0347241 | A1* | 12/2016 | Gralto .................... G06Q 90/00 |
| 2017/0320501 | A1 | 11/2017 | Li et al. |
| 2018/0093675 | A1 | 4/2018 | Holub et al. |
| 2019/0118852 | A1 | 4/2019 | Suzuki et al. |
| 2019/0310678 | A1 | 10/2019 | Wojciechowski et al. |
| 2020/0269861 | A1* | 8/2020 | Liffman ................ B60W 50/14 |
| 2020/0317152 | A1 | 10/2020 | Ghaffari et al. |
| 2020/0398725 | A1* | 12/2020 | Mullen ................ B60N 3/044 |
| 2021/0061312 | A1 | 3/2021 | Wang |
| 2021/0146899 | A1 | 5/2021 | Bayer |
| 2022/0144224 | A1 | 5/2022 | Tarandek et al. |

OTHER PUBLICATIONS

Notice of Allowance issued in related U.S. Appl. No. 17/147,880, dated Dec. 29, 2021 (11 pages).
Non Final Office Action issued in related U.S. Appl. No. 17/147,920, dated Oct. 13, 2023 (10 pages).

* cited by examiner

METHOD OF CONTROLLING OPERATION OF FOLDABLE ACCELERATOR PEDAL DEVICE IN MANUAL DRIVING MODE OF AUTONOMOUS DRIVING VEHICLE

CROSS REFERENCE TO RELATED APPLICATION

The present application claims priority to and the benefit of Korean Patent Application No. 10-2020-0104850, filed on Aug. 20, 2020, the entire contents of which are incorporated herein by reference.

FIELD

The present disclosure relates to a method of controlling the operation of a foldable accelerator pedal device in manual driving mode of an autonomous driving vehicle.

BACKGROUND

The statements in this section merely provide background information related to the present disclosure and may not constitute prior art.

Autonomous driving vehicles are smart vehicles based on autonomous driving technology enabling a vehicle to autonomously travel to a destination without a driver manually operating a steering wheel, an accelerator pedal, a brake, or the like. Recently, the development of such autonomous driving vehicles is actively underway.

When autonomous driving is generally performed, a driver may select one mode from manual driving mode in which the driver manually drives a vehicle to a destination and autonomous driving mode in which the vehicle drives to the destination by itself so that the driver does not need to drive the vehicle.

In the autonomous driving mode, the driver may take a rest by stretching legs. However, when pedals (e.g. the accelerator pedal and the brake pedal) located in the lower space of the driver's seat are exposed to the interior of the cabin, the rest of the driver may be disturbed. In particular, when the pad of a pedal device is erroneously operated by the driver, the autonomous driving may be forcibly stopped, thereby increasing the possibility of an accident.

Therefore, the development of foldable pedal devices in autonomous driving vehicle is underway. Such a foldable pedal device is configured such that the pad thereof protrudes and is exposed toward a driver in the manual driving mode in which the driver manually drives a vehicle. The pedal device may be operated by the driver (pop-up state) or the pad thereof is hidden and does not protrude toward the driver so as not to be operated by the driver so that the driver may take a comfortable rest and erroneous operation may be inhibited (hiding state).

In addition, when the speed of an autonomous driving vehicle currently being driven in the manual driving mode exceeds the driving speed limit of a road, a foldable accelerator pedal device of the related art is not provided with a device for notifying the driver of this situation.

Even in the case that such a foldable accelerator pedal device for an autonomous driving vehicle is provided with a device for notifying a driver that the driving speed limit is exceeded, most related-art configurations further include an actuator for warning (or alerting) the driver, in addition to an actuator used in the foldable pedal device.

The foregoing is intended merely to aid in the understanding of the background of the present disclosure, and is not intended to mean that the present disclosure falls within the purview of the related art that is already known to those skilled in the art.

SUMMARY

The present disclosure provides a method of controlling the operation of a foldable accelerator pedal device in manual driving mode of an autonomous driving vehicle. In a situation in which an autonomous driving vehicle provided with the foldable accelerator pedal device is being driven in the manual driving mode, when the speed of the autonomous driving vehicle exceeds the driving speed limit of a road, a safety mode is activated using an actuator provided for a folding function of a pedal pad in order to warn a driver of this situation and thus inhibit an accident.

The present disclosure provides a method of activating the safety mode using the actuator provided for the folding function of the pedal pad, thereby reducing the volume, weight, and cost of the foldable accelerator pedal device.

The present disclosure provides a method of activating the safety mode consisting of a haptic mode, a pedal pad protrusion reducing mode (i.e. a mode in which the protrusion of the pedal pad is reduced), and a pedal pad hiding mode by operating the actuator in the situation in which the speed of the autonomous driving vehicle exceeds the driving speed limit of a road, thereby diversifying a safety function, thereby improving the product value of the foldable accelerator pedal device.

According to one form of the present disclosure, there is provided a method of operating a foldable accelerator pedal device in manual driving mode of an autonomous driving vehicle. The method may include: an overspeeding determination operation of determining whether or not a driving speed of an autonomous driving vehicle provided with a foldable accelerator pedal device exceeds a road speed limit in a situation in which the autonomous driving vehicle is in manual driving mode; and when it is determined in the overspeeding determination operation that the driving speed exceeds the road speed limit, an accident prevention operation of operating, by the foldable accelerator pedal device, a pedal pad using an actuator actuated for a pop-up operation and a hiding operation of the pedal pad and activating a safety mode for sending a warning to a driver by an operation of the pedal pad. The safety mode activated in the accident prevention operation may include a haptic mode, a pedal pad protrusion reducing mode in which a length of protrusion of the pedal pad is reduced, and a pedal pad hiding mode in which the pedal pad is hidden.

Comparing the driving speed and the road speed limit in the overspeeding determination operation may include the vehicle controller performing a first check, second check, and third check continuously performed at time differences on a road having the same speed limit. Different types of the safety mode may be activated through the first checking, the second checking, and the third checking in the accident prevention operation.

The method may further include: when it is determined in the first checking that the driving speed of the vehicle exceeds the road speed limit, determining whether or not an accelerator position sensor (APS) signal is generated; when it is determined in the determination of whether or not the APS signal is generated that no APS signal is generated, controlling only a warning device to operate to send a warning to the driver; and when it is determined in the determination of whether or not the APS signal is generated that the APS signal is generated, performing the haptic mode by actuating the actuator.

The warning generated by the warning device may include at least one of a visual warning using a display and a warning light, or an audible warning using sound.

The warning device may be simultaneously operated when the haptic mode is activated.

When it is determined in the second checking that the driving speed does not exceed the road speed limit, the haptic mode activated after the first checking may be stopped by stopping the actuator.

When it is determined in the second checking that the driving speed exceeds the road speed limit, the protrusion reducing mode of the pedal pad may be activated by actuating the actuator.

The haptic mode may be simultaneously activated when the protrusion reducing mode of the pedal pad is activated.

When it is determined in the third checking that the driving speed does not exceed the road speed limit, the pedal pad protrusion reducing mode activated after the second checking may be stopped by stopping the actuator, and the length of protrusion of the pedal pad may be returned to a normal pop-up position.

When it is determined in the third checking that the driving speed exceeds the road speed limit, the hiding mode of the pedal pad may be forcibly activated by actuating the actuator.

When the hiding mode of the pedal pad is activated after the third checking, driving mode of the autonomous driving vehicle may be changed from the manual driving mode to autonomous driving mode.

According to one form of the present disclosure, there is provided a method of operating a foldable accelerator pedal device in manual driving mode of an autonomous driving vehicle. The method may include: overspeeding determination operation of determining whether or not a driving speed of an autonomous driving vehicle provided with a foldable accelerator pedal device exceeds a road speed limit in a situation in which the autonomous driving vehicle is in manual driving mode; and when it is determined in the overspeeding determination operation that the driving speed exceeds the road speed limit, accident prevention operation of operating, by the foldable accelerator pedal device, a pedal pad using an actuator actuated for a pop-up operation and a hiding operation of the pedal pad and activating a safety mode for sending a warning to a driver by an operation of the pedal pad. The safety mode activated in the accident prevention operation may include a haptic mode and a pedal pad hiding mode in which the pedal pad is hidden.

Comparing the driving speed and the road speed limit in the overspeeding determination operation may include first checking and second checking continuously performed at a time difference on a road having the same speed limit. Different types of the safety mode may be activated through the first checking and the second checking in the accident prevention operation.

The method may further include: when it is determined in the first checking that the driving speed of the vehicle exceeds the road speed limit, determining whether or not an APS signal is generated; when it is determined in the determination of whether or not the APS signal is generated that no APS signal is generated, controlling only a warning device to operate to send a warning to the driver; and when it is determined in the determination of whether or not the APS signal is generated that the APS signal is generated, performing the haptic mode by actuating the actuator.

The warning generated by the warning device may include at least one of a visual warning using a display and a warning light, or an audible warning using sound.

The warning device may be simultaneously operated when the haptic mode is activated.

When it is determined in the second checking that the driving speed does not exceed the road speed limit, the haptic mode activated after the first checking may be stopped by stopping the actuator.

When it is determined in the second checking that the driving speed exceeds the road speed limit, the hiding mode of the pedal pad may be forcibly activated by actuating the actuator.

When the hiding mode of the pedal pad is activated after the second checking, driving mode of the autonomous driving vehicle may be changed from the manual driving mode to autonomous driving mode.

In the method of controlling the operation of a foldable accelerator pedal device in manual driving mode of an autonomous driving vehicle according to the present disclosure, in a situation in which an autonomous driving vehicle provided with the foldable accelerator pedal device is being driven in manual driving mode, when the speed of the autonomous driving vehicle exceeds the driving speed limit of a road, a safety mode is activated using the actuator provided for a folding function of the pedal pad in order to warn a driver of this situation and thus inhibit an accident.

In addition, in the method of controlling the operation of a foldable accelerator pedal device in manual driving mode of an autonomous driving vehicle according to the present disclosure, the safety mode may be activated using the actuator of the foldable accelerator pedal device provided for the folding function of the pedal pad, without having to further include an additional actuator, such as a coin motor, so that the volume, weight, and cost of the foldable accelerator pedal device may be reduced.

In addition, in the method of controlling the operation of a foldable accelerator pedal device in manual driving mode of an autonomous driving vehicle according to the present disclosure, the safety mode include the haptic mode, pedal the pad protrusion reducing mode (i.e. a mode in which the protrusion of the pedal pad is reduced), and the pedal pad hiding mode by operating the actuator in the situation in which the speed of the autonomous driving vehicle exceeds the driving speed limit of a road, thereby diversifying the safety function, thereby improving the product value of the foldable accelerator pedal device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION OF THE DISCLOSURE

Specific structural and functional descriptions of the present disclosure disclosed herein are only for illustrative purposes. The present disclosure may be embodied in many different forms without departing from the spirit and significant characteristics of the present disclosure. Therefore, various forms of the present disclosure are disclosed only for illustrative purposes and should not be construed as limiting the present disclosure.

Reference will now be made in detail to various foils of the present disclosure, specific examples of which are illustrated in the accompanying drawings and described below, since the present disclosure can be variously modified in many different forms. While the present disclosure will be described in conjunction with exemplary forms thereof, it is to be understood that the present description is not intended to limit the present disclosure to those exemplary forms. On the contrary, the present disclosure is intended to cover not only the exemplary forms, but also various alternatives, modifications, equivalents and other forms that may be included within the spirit and scope of the present disclosure as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

The terminology used herein is for the purpose of describing particular forms only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The controller according to exemplary forms of the present disclosure may be implemented using a non-volatile memory (not shown) configured to store data regarding an algorithm for controlling the operations of a variety of components of a vehicle or software instructions for reproducing the algorithm and a processor (not shown) configured to execute the following operations using the data stored in the memory. The memory and the process may be implemented as separate chips, respectively. As an alternative, the memory and the processor may be implemented as a single integrated chip. The processor may be one or more processors.

Hereinafter, a method of operating a foldable accelerator pedal device in manual driving mode of an autonomous driving vehicle according to exemplary forms of the present disclosure will be described in detail with reference to the accompanying drawings.

In an autonomous driving vehicle, a driver may select one mode from manual driving mode in which the driver manually drives a vehicle and autonomous driving mode in which the driver does not drive the vehicle but the vehicle drives to a destination by itself.

Figure 1:
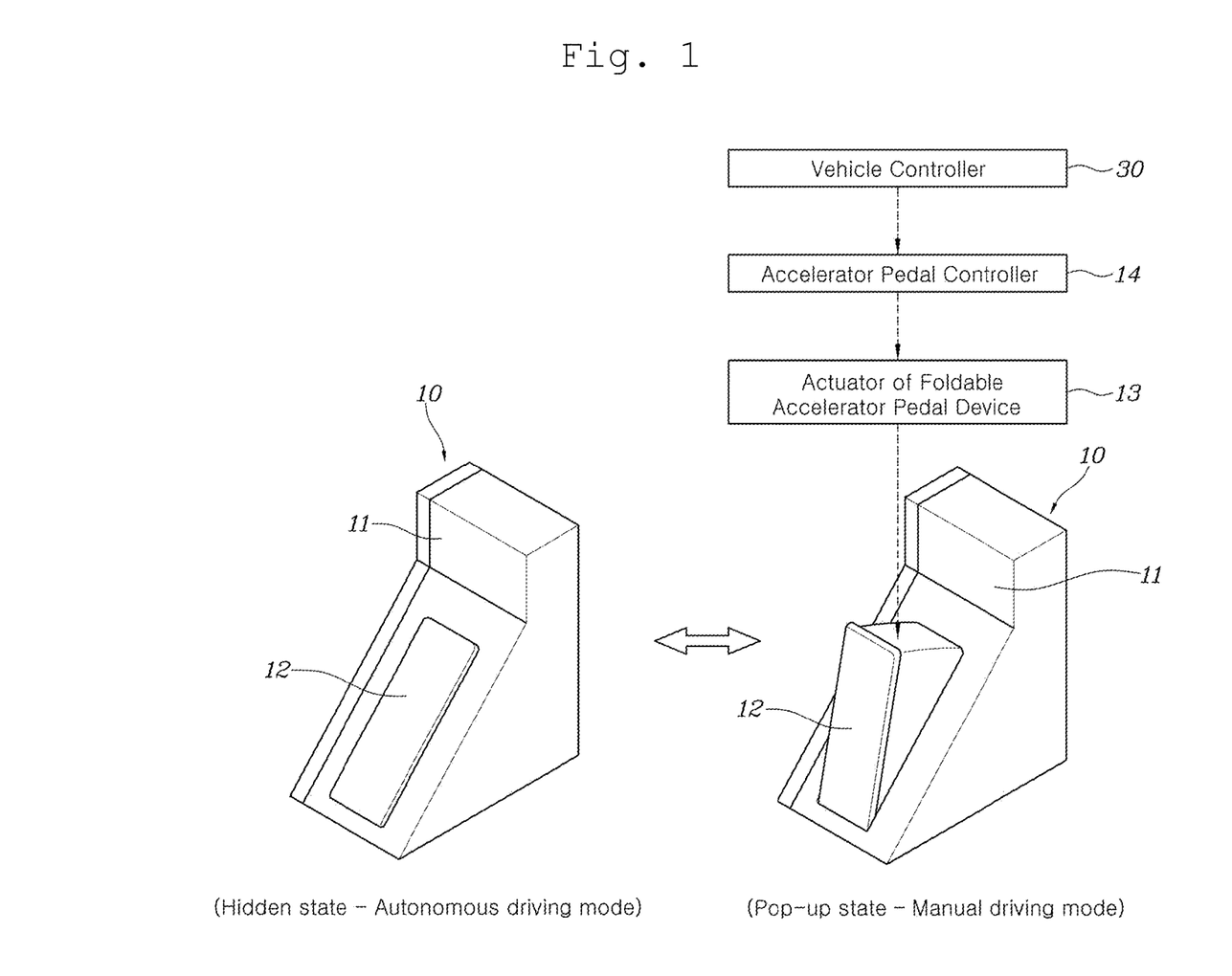
FIG. 1 is a perspective view illustrating one form of a foldable accelerator pedal device to which the present disclosure is applied.

In addition, as illustrated in FIG. 1, the autonomous driving vehicle may be provided with a foldable accelerator pedal device 10. The foldable accelerator pedal device 10 includes a pedal housing 11 and a pedal pad 12 rotatably connected to the pedal housing 11.

The pedal housing 11 may be disposed to be located in the lower space of the driver's seat inside the cabin, and the pedal pad 12 is operated by a foot of the driver.

In the autonomous driving vehicle provided with the foldable accelerator pedal device 10, in the manual driving mode, the driver operates the pedal pad 12 with his or her foot. In this regard, the pedal pad 12 must be in a pop-up state, in which the pedal pad 12 protrudes from the pedal housing 11, so as to be exposed toward the driver.

In addition, in the autonomous driving mode, the pedal pad 12 must be in a hiding state in which the pedal pad 12 is inserted into the pedal housing 11 without protruding toward the driver in order to provide the driver with a comfortable rest, inhibit erroneous operations, and ensure safety. In this state, the pedal pad 12 must not protrude toward the driver.

In order to realize the pop-up state and the hiding state of the pedal pad 12, the foldable accelerator pedal device 10 may further include an actuator 13 of the foldable accelerator pedal device. The actuator 13 serves to forcibly rotate the pedal pad 12, and may be a motor.

The foldable accelerator pedal device 10 may also be provided with an accelerator pedal controller 14. The operation of the actuator 13 is controlled by the accelerator pedal controller 14 and the pedal pad 12 rotates about the pedal housing 11 in response to the operation of the actuator 13, so that the pedal pad 12 may be converted to the pop-up state or the hiding state.

Figure 2:
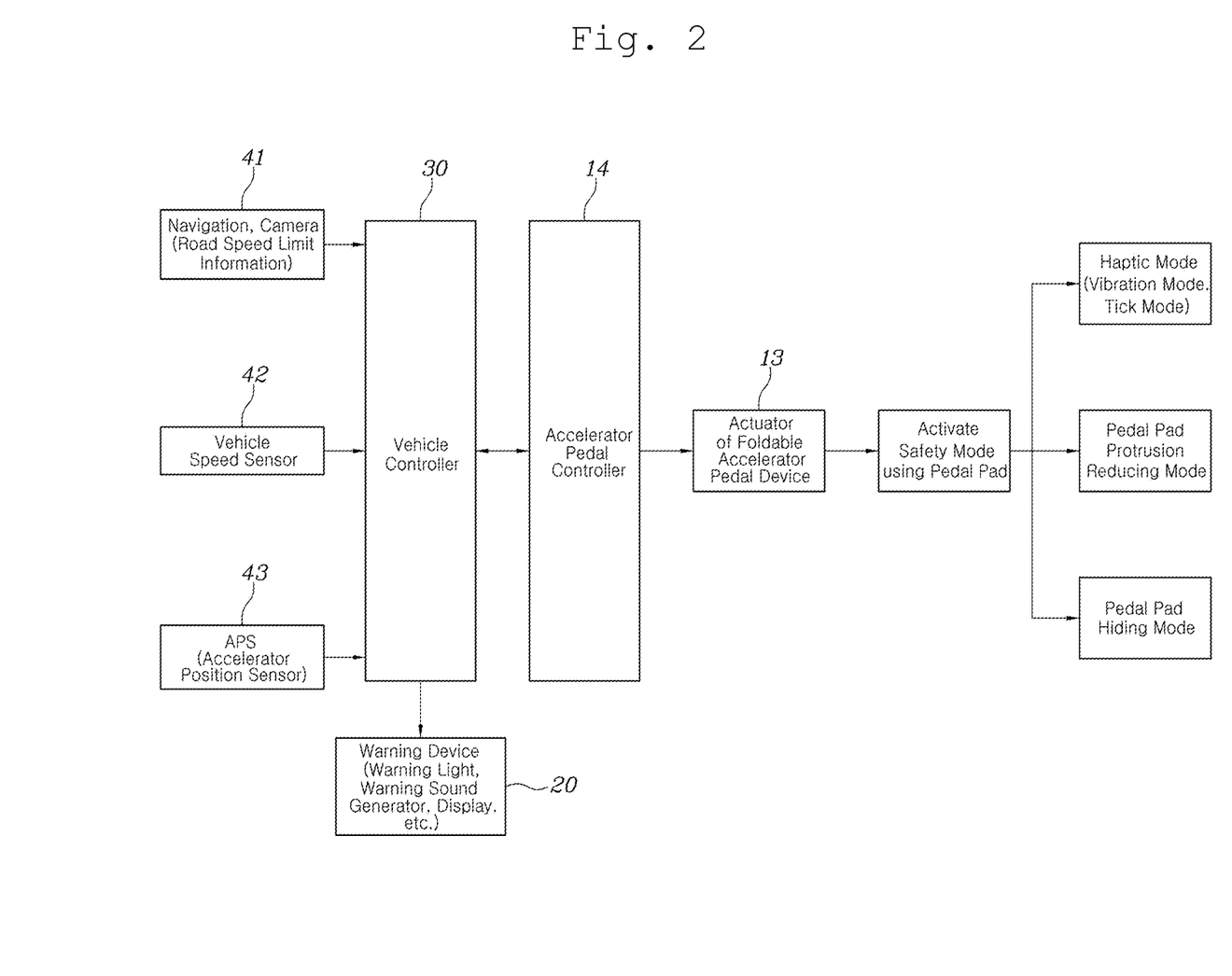
FIG. 2 is a schematic block diagram illustrating one form of a method of controlling an operation of a foldable accelerator pedal device according to the present disclosure when an autonomous driving vehicle is in manual driving mode.

The accelerator pedal controller 14 is configured to be able to transmit signals to a vehicle controller 30 and receive signals therefrom. The vehicle controller 30 has information regarding the driving speed limit of a road input by a navigation device and a camera 41, driving speed information input by a vehicle speed sensor 42, and signal information input by an accelerator position sensor (APS) 43.

In addition, the vehicle controller 30 may control the operation of a warning device 20. The warning device 20 may be a warning light, a warning sound generator, a display, or the like. A warning generated by the warning device 20 may include at least one of a visual warning or an audible warning.

One form according to the present disclosure is characterized in that, in a situation in which an autonomous driving vehicle provided with the foldable accelerator pedal device 10 is being driven in the manual driving mode, when the speed of the autonomous driving vehicle exceeds the driving speed limit of a road, a safety mode may be activated using the actuator 13 of the foldable accelerator pedal device 10 provided for the folding function of the pedal pad 12, and the driver may be notified of an overspeeding situation by the activation of the safety mode, so that an accident due to the driving at an overspeed may be inhibited.

Figure 3:
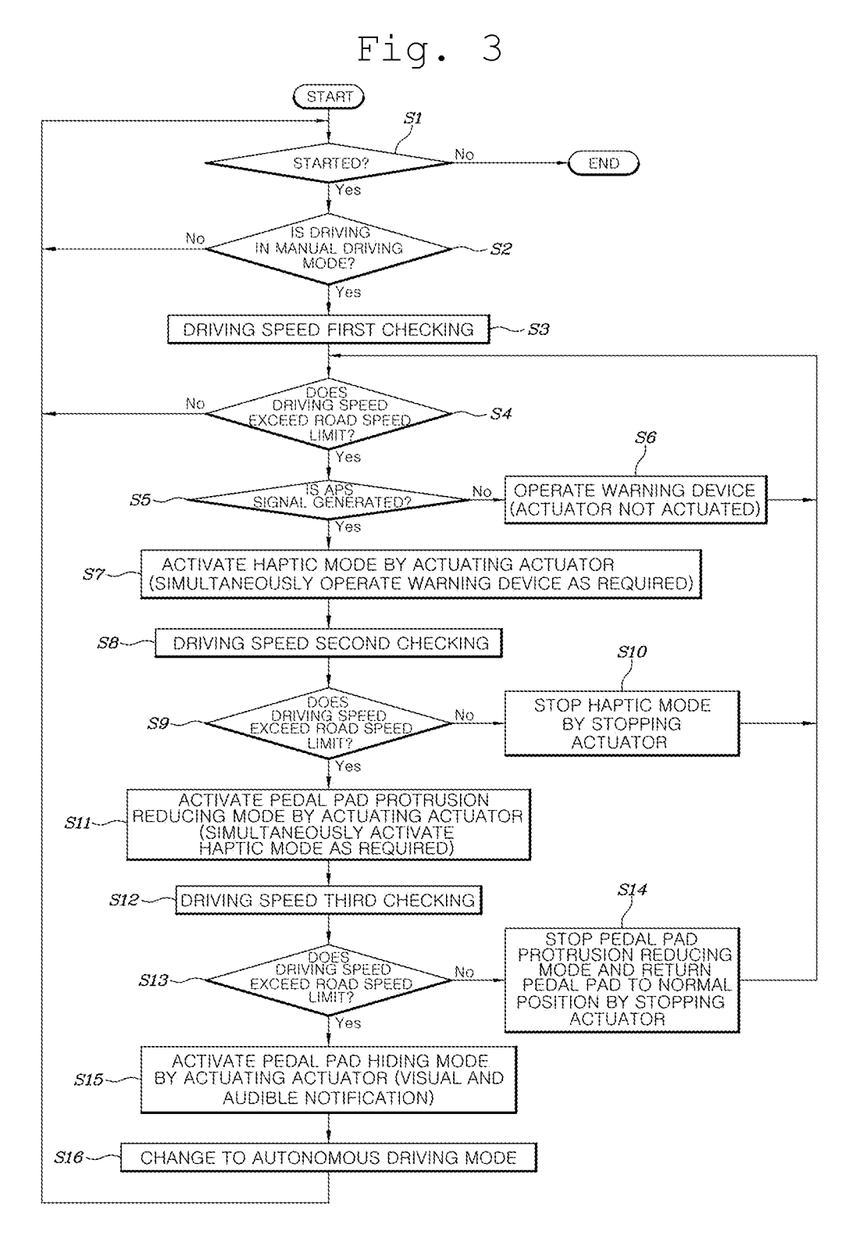
FIG. 3 is a flowchart illustrating a first form of the method of controlling the operation of a foldable accelerator pedal device according to the present disclosure when the autonomous driving vehicle is in the manual driving mode.

That is, as illustrated in FIGS. 1 to 3, a control method according to a first form of the present disclosure includes: an overspeeding determination step of determining whether or not the driving speed of the autonomous driving vehicle provided with the foldable accelerator pedal device 10 exceeds a road speed limit in a situation in which the autonomous driving vehicle is in the manual driving mode; and an accident prevention step of, when it is determined in the overspeeding determination step that the driving speed exceeds the road speed limit, operating, by the foldable accelerator pedal device 10, the pedal pad 12 using the actuator 13 actuated for a pop-up operation and a hiding operation of the pedal pad 12 and activating the safety mode for sending a warning (or alert) to the driver by the operation of the pedal pad 12. The safety mode activated in the accident prevention step includes a haptic mode, a pedal pad protrusion reducing mode in which the protrusion of the pedal pad 12 is reduced, and a pedal pad hiding mode in which the pedal pad 12 is hidden.

The driving mode of the autonomous driving vehicle may be configured so as to be changed between the autonomous driving mode and the manual driving mode, for example, by the operation of a mode switch.

In addition, the change between the autonomous driving mode and the manual driving mode may be forcibly performed under the control of the vehicle controller 30 in order to inhibit an accident in an emergency or during driving.

The haptic mode activated in the accident prevention step may be one of a vibration mode and a tick mode of the pedal pad 12. The haptic mode may be activated by repeatedly applying rapid signal having opposite phases to the actuator 13 under the control of the accelerator pedal controller 14 so that the pedal pad 12 repeatedly rotates in a pop-up direction and a hiding direction.

When the haptic mode is activated in this manner, the initial progressing direction of the pedal pad 12 may be determined so that the initial operation of the pedal pad 12 is in the hiding direction with respect to the popped-up state of the pedal pad 12. Consequently, the driver may rapidly sense a haptic warning without a time delay.

When the initial progressing direction of the pedal pad 12 is determined so that the initial operation of the pedal pad 12 is performed in the pop-up direction on the basis of the popped-up state of the pedal pad 12, the driver may not sense the haptic warning directly through the pedal pad 12 and sense the haptic warning when the pedal pad 12 moves in the hiding direction thereafter, thereby leading to a time delay.

In addition, in the protrusion reducing mode of the pedal pad 12 activated in the accident prevention step, the actuator 13 is actuated under the control of the accelerator pedal controller 14 so that the pedal pad 12 is forced to hide at a predetermined angle in the pedal housing 11. When the protrusion of the pedal pad 12 in a normal state is 100% with respect to the popped-up state of the pedal pad 12, the protrusion of the pedal pad 12 in the protrusion reducing mode of the pedal pad 12 is about 80%.

When the protrusion of the pedal pad 12 is forcibly reduced by a predetermined angle in the pop-up of the pedal pad 12, even though the driver fully operates the pedal pad 12, the full stroke of the pedal pad 12 may be adjusted to be about 80% of that of the normal state, thereby forcibly reducing the acceleration and inhibiting an accident that would otherwise be caused by the overspeed.

In addition, the hiding mode of the pedal pad 12 activated in the accident prevention step is a process of fundamentally inhibiting the driver's operation of the pedal pad 12. The hiding mode of the pedal pad 12 may be activated in an emergency in which the possibility of an accident is highest.

In the overspeeding determination step, comparing the driving speed and the road speed limit may include a first checking step, a second checking step, and a third checking step continuously performed at time differences on a road having the same speed limit. In the accident prevention step, different types of the safety mode may be activated through the first checking step, the second checking step, and the third checking step.

Hereinafter, the control method according to the first form of the present disclosure will be described with reference to FIG. 3.

In a situation in which an autonomous driving vehicle provided with the foldable accelerator pedal device 10 is started (step S1), when the autonomous driving vehicle drives in the manual driving mode (step S2), the vehicle controller 30 checks, a first time, the current driving speed of the vehicle using information regarding the road speed limit obtained by the navigation device and the camera 41 and information obtained by the vehicle speed sensor 42 (step S3) and determines whether or not the vehicle is currently in an overspeeding state, i.e. whether or not the current driving speed of the vehicle exceeds the road speed limit (step S4).

When it is determined in the step S4 that the driving speed of the vehicle exceeds the road speed limit, the vehicle controller 30 determines whether or not an APS signal is generated by the APS 43 (step S5), and when it is determined that no APS signal is generated, sends a warning to the driver by controlling only the warning device 20 to operate (step S6).

The situation in which no APS signal is generated is a situation in which the driver does not operate the pedal pad 12. That is, even in the case that the driving speed exceeds the road speed limit, when the driver does not operate the pedal pad 12, the driving speed of the vehicle gradually decreases to be finally less than the road speed limit.

In addition, the situation in which no APS signal is generated may be determined to be a situation in which the driver does not operate the pedal pad 12 in order to reduce the driving speed by recognizing the overspeeding state. Thus, when no APS signal is generated in a situation in which the driving speed exceeds the road speed limit, the controlling process is performed to send a warning to the driver by only operating the warning device 20.

The warning generated by the warning device 20 may include at least one of a visual warning using a display and a warning light or an audible warning using sound.

However, when it is determined in step S5 that the APS signal is generated, the haptic mode is performed (step S7). In the haptic mode, the vehicle controller 30 sends information regarding this situation to the accelerator pedal controller 14, the actuator 13 is actuated under the control of the accelerator pedal controller 14, and the pedal pad 12 is operated by the actuation of the actuator 13.

The haptic mode includes the vibration mode and the tick mode of the pedal pad 12. The haptic mode may include the vibration mode and the tick mode of the pedal pad 12, and may be configured such that one of the vibration mode and the tick mode is activated or the vibration mode and the tick mode are repeatedly activated in a periodic manner.

In addition, when the haptic mode is activated, the warning device 20 may be controlled to operate simultaneously with the haptic mode as required, so that a warning may be sent to the driver in a more reliable manner.

When the first checking step is completed, the second checking step of re-checking the driving speed at a time difference is performed (step S8). By the second checking, it is determined again that whether or not the vehicle is in an overspeeding state, i.e. whether or not the driving speed exceeds the road speed limit (step S9).

When it is determined in the step S9 that the driving speed does not exceed the road speed limit, it is determined that the vehicle is not in the overspeeding state, the actuation of the actuator 13 is stopped under the control of the accelerator pedal controller 14, and the activation of the haptic mode activated after the first checking step is stopped in response to the stopped actuation of the actuator 13 (step S10).

However, when it is determined in the step S9 that the driving speed exceeds the road speed limit, it is determined that the vehicle is in a dangerous situation, i.e. the vehicle has been continuously overspeeding after the first checking step, and the protrusion reducing mode of the pedal pad 12 is activated by actuating the actuator 13 (step S11).

When the protrusion reducing mode of the pedal pad 12 is activated, the maximum protrusion of the pedal pad 12 is about 80%, which is reduced by about 20% from the normal state, with respect to the popped-up state of the pedal pad 12.

When the protrusion of the pedal pad 12 is forcibly reduced by a predetermined angle in the pop-up of the pedal pad 12 in this manner, even in the case that the driver fully operates the pedal pad 12, the full stroke of the pedal pad 12 is about 80% of that of the normal state. Consequently, the acceleration of the vehicle may be forcibly reduced, thereby inhibiting an accident that would otherwise be caused by the overspeed.

In addition, when the protrusion reducing mode of the pedal pad 12 is activated, the haptic mode may be simultaneously activated in order to more reliably send a warning to the driver.

The protrusion reducing mode of the pedal pad 12 activated in the second checking step is a process performed in order to more actively inhibit an accident than the haptic mode activated in the first checking step.

After the second checking step is completed, the third checking step of re-checking the driving speed at a time difference is performed (step S12). By the third checking, it is determined again that whether or not the driving speed exceeds the road speed limit (step S13).

When it is determined in the step S13 that the driving speed does not exceed the road speed limit, it is determined that the vehicle is not in the overspeeding state, the actuation of the actuator 13 is stopped under the control of the accelerator pedal controller 14, the activation of the haptic mode activated after the second checking step is stopped in response to the stopped actuation of the actuator 13, and the protrusion of the pedal pad 12 returns to the pop-up position of the normal state in response to the rotation of the pedal pad 12 caused by the operation of the actuator 13 (step S14).

However, when it is determined in the step S13 that the driving speed exceeds the road speed limit, it is determined that the vehicle is in a dangerous situation, i.e. the vehicle has been continuously overspeeding after the second checking step, and the hiding mode of the pedal pad 12 is forcibly activated by the actuation of the actuator 13 (step S15).

When the hiding mode of the pedal pad 12 is activated, the pedal pad 12 is completely retracted into the pedal housing 11, thereby fundamentally inhibiting the driver from operating the pedal pad 12. Consequently, an accident prevention process stronger than that performed in the protrusion reducing mode of the pedal pad 12 activated in the second checking step is performed.

When the hiding mode of the pedal pad 12 is performed, the controlling process may be performed to simultaneously perform a visual warning using a display and a warning light and an audible warning using sound in order to more reliably send a warning to the driver.

In addition, according to the first form of the present disclosure, after the hiding mode of the pedal pad 12 is activated by the third checking step, the vehicle may be safely driven to a destination by changing the driving mode from the manual driving mode to the autonomous driving mode under the forced control of the vehicle controller 30 (step S16).

Figure 4:
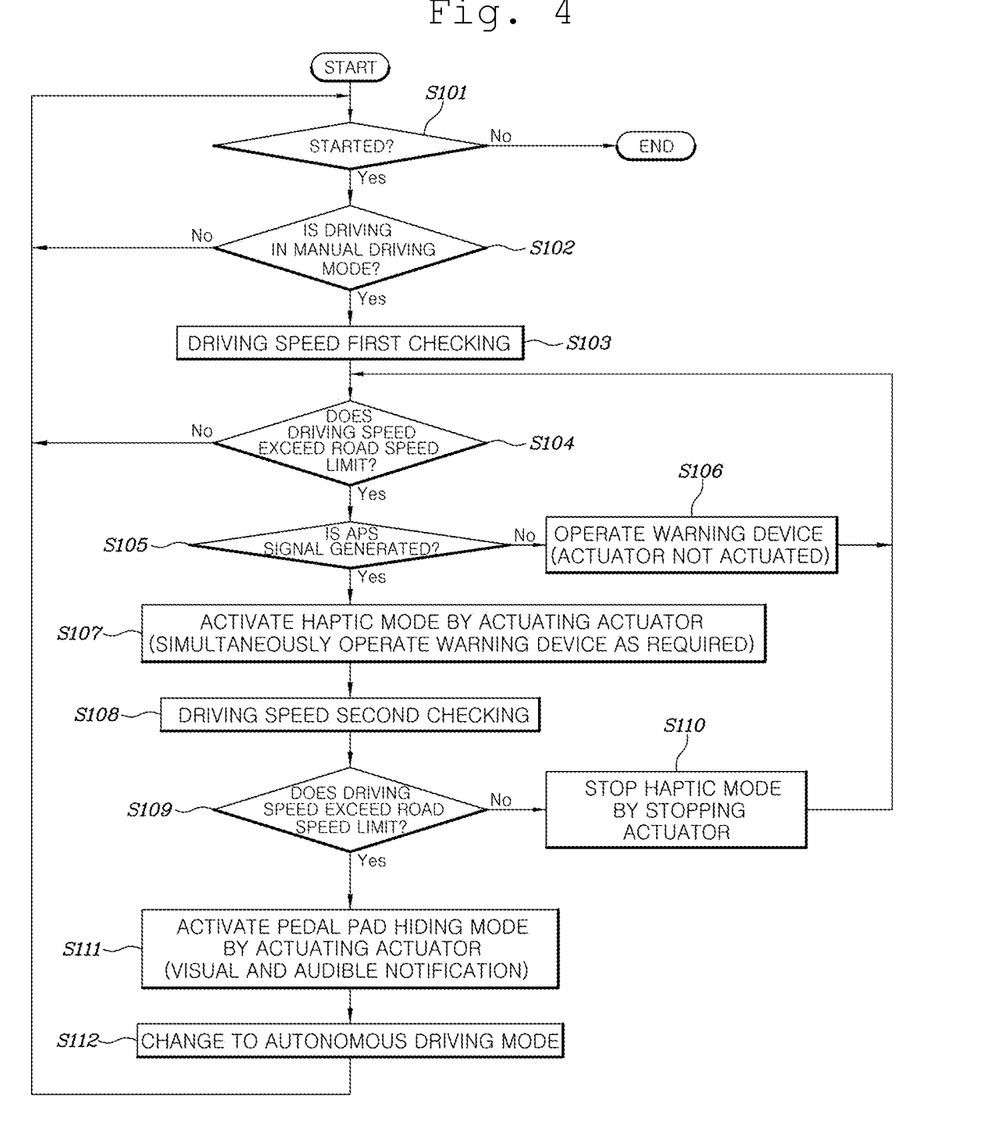
FIG. 4 is a flowchart illustrating a second form of the method of controlling the operation a foldable accelerator pedal device according to the present disclosure when an autonomous driving vehicle is in manual driving mode.

In addition, as illustrated in FIGS. 1, 2, and 4, a control method according to a second form of the present disclosure includes: an overspeeding determination step of determining whether or not the driving speed of the autonomous driving vehicle provided with the foldable accelerator pedal device 10 exceeds a road speed limit in a situation in which the autonomous driving vehicle is in the manual driving mode; and an accident prevention step of, when it is determined in the overspeeding determination step that the driving speed exceeds the road speed limit, operating, by the foldable accelerator pedal device 10, the pedal pad 12 using the actuator 13 actuated for a pop-up operation and a hiding operation of the pedal pad 12 and activating the safety mode for sending a warning to the driver by the operation of the pedal pad 12. The safety mode activated in the accident prevention step includes haptic mode and pedal pad hiding mode in which the pedal pad 12 is hidden.

The driving mode of the autonomous driving vehicle may be configured so as to be changed between the autonomous driving mode and the manual driving mode, for example, by the operation of a mode switch.

In addition, the change between the autonomous driving mode and the manual driving mode may be forcibly performed under the control of the vehicle controller 30 in order to inhibit an accident in an emergency or during driving.

The haptic mode activated in the accident prevention step may be one of a vibration mode and a tick mode of the pedal pad 12. The haptic mode may be activated by repeatedly applying rapid signal having opposite phases to the actuator 13 under the control of the accelerator pedal controller 14 so that the pedal pad 12 repeatedly rotates in a pop-up direction and a hiding direction.

When the haptic mode is activated in this manner, the initial progressing direction of the pedal pad 12 may be determined so that the initial operation of the pedal pad 12 is in the hiding direction with respect to the popped-up state of the pedal pad 12. Consequently, the driver may rapidly sense a haptic warning without a time delay.

When the initial progressing direction of the pedal pad 12 is determined so that the initial operation of the pedal pad 12 is performed in the pop-up direction on the basis of the popped-up state of the pedal pad 12, the driver may not sense the haptic warning directly through the pedal pad 12 and sense the haptic warning when the pedal pad 12 moves in the hiding direction thereafter, thereby leading to a time delay.

In addition, the hiding mode of the pedal pad 12 activated in the accident prevention step is a process of fundamentally inhibiting the driver's operation of the pedal pad 12. The hiding mode of the pedal pad 12 may be activated in an emergency in which the possibility of an accident is the highest.

In the overspeeding determination step, comparing the driving speed and the road speed limit may include a first checking step and a second checking step continuously performed on a road having the same speed limit at a time difference. In the accident prevention step, different types of the safety mode may be activated through the first checking step and the second checking step.

Hereinafter, the control method according to the second form of the present disclosure will be described with reference to FIG. 4.

In a situation in which an autonomous driving vehicle provided with the foldable accelerator pedal device 10 is started (step S101), when the autonomous driving vehicle drives in the manual driving mode (step S102), the vehicle controller 30 checks, a first time, the current driving speed of the vehicle using information regarding the road speed limit obtained by the navigation device and the camera 41 and information obtained by the vehicle speed sensor 42 (step S103) and determines whether or not the vehicle is currently in an overspeeding state, i.e. whether or not the current driving speed of the vehicle exceeds the road speed limit (step S104).

When it is determined in the step S104 that the driving speed of the vehicle exceeds the road speed limit, the vehicle controller 30 determines whether or not an APS signal is generated by the APS 43 (step S105), and when it is determined that no APS signal is generated, sends a warning to the driver by controlling only the warning device 20 to operate (step S106).

The situation in which no APS signal is generated is a situation in which the driver does not operate the pedal pad 12. That is, even in the case that the driving speed exceeds the road speed limit, when the driver does not operate the pedal pad 12, the driving speed of the vehicle gradually decreases to be finally less than the road speed limit.

In addition, the situation in which no APS signal is generated may be determined to be a situation in which the driver does not operate the pedal pad 12 in order to reduce the driving speed by recognizing the overspeeding state. Thus, when no APS signal is generated in a situation in which the driving speed exceeds the road speed limit, the controlling process is performed to send a warning to the driver by only operating the warning device 20.

The warning generated by the warning device 20 may include at least one of a visual warning using a display and a warning light, or an audible warning using sound.

However, when it is determined in step S105 that the APS signal is generated, the haptic mode is performed (step S107). In the haptic mode, the vehicle controller 30 sends information regarding this situation to the accelerator pedal controller 14, the actuator 13 is actuated under the control of the accelerator pedal controller 14, and the pedal pad 12 is operated by the actuation of the actuator 13.

The haptic mode includes the vibration mode and the tick mode of the pedal pad 12. The haptic mode may include the vibration mode and the tick mode of the pedal pad 12, and may be configured such that one of the vibration mode and the tick mode is activated or the vibration mode and the tick mode are repeatedly activated in a periodic manner.

In addition, when the haptic mode is activated, the warning device 20 may be controlled to operate simultaneously with the haptic mode as required, so that a warning may be sent to the driver in a more reliable manner.

When the first checking step is completed, the second checking step of re-checking the driving speed at a time difference is performed (step S108). By the second checking, it is determined again that whether or not the vehicle is in an overspeeding state, i.e. whether or not the driving speed exceeds the road speed limit (step S109).

When it is determined in the step S109 that the driving speed does not exceed the road speed limit, it is determined that the vehicle is not in the overspeeding state, the actuation of the actuator 13 is stopped under the control of the accelerator pedal controller 14, and the activation of the haptic mode activated after the first checking step is stopped in response to the stopped actuation of the actuator 13 (step S110).

However, when it is determined in the step S109 that the driving speed exceeds the road speed limit, it is determined that the vehicle is in a dangerous situation, i.e. the vehicle has been continuously overspeeding after the first checking step, and the hiding mode of the pedal pad 12 is forcibly activated by the actuation of the actuator 13 (step S111).

When the hiding mode of the pedal pad 12 is activated, the pedal pad 12 is completely retracted into the pedal housing 11, thereby fundamentally inhibiting the driver from operating the pedal pad 12. Consequently, an accident prevention process stronger than that performed in the haptic mode activated in the first checking step is performed.

When the hiding mode of the pedal pad 12 is performed, the controlling process may be performed to simultaneously perform a visual warning using a display and a warning light and an audible warning using sound in order to more reliably send a warning to the driver.

In addition, according to the second form of the present disclosure, after the hiding mode of the pedal pad 12 is activated by the second checking step, the vehicle may be safely driven to a destination by changing the driving mode from the manual driving mode to the autonomous driving mode under the forced control of the vehicle controller 30 (step S112).

As set forth above, in the method of controlling the operation of a foldable accelerator pedal device in manual driving mode of an autonomous driving vehicle according to the present disclosure, in a situation in which an autonomous driving vehicle provided with the foldable accelerator pedal device 10 is being driven in manual driving mode, when the speed of the autonomous driving vehicle exceeds the driving speed limit of a road, a safety mode is activated using the actuator 13 provided for a folding function of the pedal pad 12 in order to warn a driver of this situation and thus inhibit an accident.

In addition, in the method of controlling the operation of a foldable accelerator pedal device in manual driving mode of an autonomous driving vehicle according to the present disclosure, the safety mode may be activated using the actuator 13 of the foldable accelerator pedal device 10 provided for the folding function of the pedal pad 12, without having to further include an additional actuator, such as a coin motor, so that the volume, weight, and cost of the foldable accelerator pedal device may be reduced.

In addition, in the method of controlling the operation of a foldable accelerator pedal device in manual driving mode of an autonomous driving vehicle according to the present disclosure, the safety mode include the haptic mode, pedal the pad protrusion reducing mode (i.e. a mode in which the protrusion of the pedal pad is reduced), and the pedal pad hiding mode by operating the actuator 13 in the situation in which the speed of the autonomous driving vehicle exceeds the driving speed limit of a road, thereby diversifying the safety function, thereby improving the product value of the foldable accelerator pedal device.

Although the specific forms of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A method of operating a foldable accelerator pedal device in a manual driving mode of an autonomous driving vehicle, the method comprising:
    comparing, with a vehicle controller, a driving speed of the autonomous driving vehicle and a road speed limit, and determining, with the vehicle controller, whether or not the driving speed exceeds the road speed limit while the autonomous driving vehicle is in the manual driving mode; and
    when the vehicle controller determines that the driving speed exceeds the road speed limit, operating, by the foldable accelerator pedal device, a pedal pad using an actuator actuated for a pop-up operation and a hiding operation of the pedal pad, and activating, using the actuator, a safety mode for sending a warning to a driver by an operation of the pedal pad,
    wherein the safety mode includes a haptic mode, a pedal pad protrusion reducing mode in which a length of protrusion of the pedal pad is reduced, and a pedal pad hiding mode in which the pedal pad is hidden,
    wherein:
        comparing the driving speed and the road speed limit comprises performing, by the vehicle controller, a first check, a second check, and a third check, which are continuously performed at time differences on a road having the same speed limit;
        when it is determined in the second check that the driving speed exceeds the road speed limit, the protrusion reducing mode of the pedal pad is activated by actuating the actuator; and
        the haptic mode is simultaneously activated when the protrusion reducing mode of the pedal pad is activated.

2. The method of claim 1, wherein:
    different types of the safety mode are activated through the first check, the second check, and the third check.

3. The method of claim 2 further comprising:
    when it is determined in the first check that the driving speed of the vehicle exceeds the road speed limit, determining, by the vehicle controller, whether or not an accelerator position sensor signal is generated;
    when it is determined that no accelerator position sensor signal is generated, controlling, by the vehicle controller, only a warning device to send a warning to the driver; and
    when it is determined that the accelerator position sensor signal is generated, performing the haptic mode by actuating the actuator.

4. The method of claim 3, wherein the warning generated by the warning device comprises at least one of a visual warning using a display and a warning light, or an audible warning using sound.

5. The method of claim 3, wherein the warning device is simultaneously operated when the haptic mode is activated.

6. The method of claim 2, wherein, when it is determined in the second check that the driving speed does not exceed the road speed limit, the haptic mode activated after the first check is stopped by stopping the actuator.

7. A method of operating a foldable accelerator pedal device in a manual driving mode of an autonomous driving vehicle, the method comprising:
    comparing, with a vehicle controller, a driving speed of the autonomous driving vehicle and a road speed limit, and determining, with the vehicle controller, whether or not the driving speed exceeds the road speed limit while the autonomous driving vehicle is in the manual driving mode; and
    when the vehicle controller determines that the driving speed exceeds the road speed limit, operating, by the foldable accelerator pedal device, a pedal pad using an actuator actuated for a pop-up operation and a hiding operation of the pedal pad, and activating, using the actuator, a safety mode for sending a warning to a driver by an operation of the pedal pad,
    wherein the safety mode includes a haptic mode, a pedal pad protrusion reducing mode in which a length of protrusion of the pedal pad is reduced, and a pedal pad hiding mode in which the pedal pad is hidden,
    wherein comparing the driving speed and the road speed limit comprises performing, by the vehicle controller, a first check, a second check, and a third check, which are continuously performed at time differences on a road having the same speed limit, and
    wherein, when it is determined in the third check that the driving speed does not exceed the road speed limit, the pedal pad protrusion reducing mode activated after the second check is stopped by stopping the actuator, and the length of protrusion of the pedal pad is returned to a normal pop-up position.

8. The method of claim 2, wherein, when it is determined in the third check that the driving speed exceeds the road speed limit, the hiding mode of the pedal pad is forcibly activated by actuating the actuator.

9. The method of claim 8, wherein, when the hiding mode of the pedal pad is activated after the third check, driving mode of the autonomous driving vehicle is changed from the manual driving mode to autonomous driving mode.

10. A method of operating a foldable accelerator pedal device in a manual driving mode of an autonomous driving vehicle, the method comprising:
    comparing, with a vehicle controller, a driving speed of the autonomous driving vehicle and a road speed limit, and determining, with the vehicle controller, whether or not the driving speed exceeds the road speed limit while the autonomous driving vehicle is in the manual driving mode;

when it is determined that the driving speed exceeds the road speed limit, operating, by the foldable accelerator pedal device, a pedal pad using an actuator actuated for a pop-up operation and a hiding operation of the pedal pad, and activating, using the actuator, a safety mode for sending a warning to a driver by an operation of the pedal pad, wherein the safety mode includes a haptic mode and a pedal pad hiding mode in which the pedal pad is hidden, wherein comparing the driving speed and the road speed limit comprises performing, by the vehicle controller, a first check and a second check, which are continuously performed at a time difference on a road having the same speed limit;

when it is determined in the first check that the driving speed of the vehicle exceeds the road speed limit, determining, by the vehicle controller, whether or not an accelerator position sensor signal is generated;

when it is determined that no accelerator position sensor signal is generated, controlling, by the vehicle controller, only a warning device to send a warning to the driver; and when it is determined that the accelerator position sensor signal is generated, performing the haptic mode by actuating the actuator.

11. The method of claim 10, wherein:
different types of the safety mode are activated through the first check and the second check.

12. The method of claim 10, wherein the warning generated by the warning device comprises at least one of a visual warning using a display and a warning light, or an audible warning using sound.

13. The method of claim 10, wherein the warning device is simultaneously operated when the haptic mode is activated.

14. The method of claim 11, wherein, when it is determined in the second check that the driving speed does not exceed the road speed limit, the haptic mode activated after the first check is stopped by stopping the actuator.

15. The method of claim 11, wherein, when it is determined in the second check that the driving speed exceeds the road speed limit, the hiding mode of the pedal pad is forcibly activated by actuating the actuator.

16. The method of claim 15, wherein, when the hiding mode of the pedal pad is activated after the second check, driving mode of the autonomous driving vehicle is changed from the manual driving mode to autonomous driving mode.

* * * * *